US012066247B2

(12) United States Patent
Zhang et al.

(10) Patent No.: US 12,066,247 B2
(45) Date of Patent: Aug. 20, 2024

(54) AIR DRYING DEVICE

(71) Applicant: BOE Technology Group Co., Ltd., Beijing (CN)

(72) Inventors: Guocai Zhang, Beijing (CN); Junwei Yan, Beijing (CN); Shaodong Sun, Beijing (CN); Shihao Dong, Beijing (CN); Yingwei Liu, Beijing (CN); Zhanfeng Cao, Beijing (CN); Guangcai Yuan, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 396 days.

(21) Appl. No.: 17/475,021

(22) Filed: Sep. 14, 2021

(65) Prior Publication Data

US 2022/0236005 A1 Jul. 28, 2022

(30) Foreign Application Priority Data

Jan. 22, 2021 (CN) ......................... 202120202391.0

(51) Int. Cl.
*F26B 9/00* (2006.01)
*C25D 5/48* (2006.01)
*F26B 9/06* (2006.01)

(52) U.S. Cl.
CPC ................ *F26B 9/003* (2013.01); *C25D 5/48* (2013.01); *F26B 9/06* (2013.01)

(58) Field of Classification Search
CPC ............... F26B 9/003; F26B 9/06; C25D 5/48
USPC ........................................................... 34/201
See application file for complete search history.

(56) References Cited

U.S. PATENT DOCUMENTS 1,073,729 A * 9/1913 Barnard .................. F26B 3/286 34/93
5,666,743 A * 9/1997 Dawson ................ A47L 23/205 34/202
6,955,516 B2 * 10/2005 Achkire ............ H01L 21/67034 414/217
2022/0236005 A1 * 7/2022 Zhang ........................ F26B 9/06

FOREIGN PATENT DOCUMENTS

CN 214747111 U * 11/2021 ............... C25D 5/48
WO WO-03041131 A2 * 5/2003 ............... B08B 3/10

* cited by examiner

*Primary Examiner* — Stephen M Gravini
(74) *Attorney, Agent, or Firm* — IPro, PLLC

(57) ABSTRACT

The present disclosure provides an air drying device including: a base including opposing top and bottom portions, the top portion including at least one first bearing surface; and at least one bearing plate disposed at the top portion of the base. The bearing plate includes a second bearing surface, and the first bearing surface is inclined relative to the second bearing surface.

15 Claims, 1 Drawing Sheet

AIR DRYING DEVICE

CROSS-REFERENCE TO RELATED APPLICATIONS

The present application claims a priority to the Chinese patent application No. 202120202391.0 filed in China on Jan. 22, 2021, a disclosure of which is incorporated herein by reference in its entirety.

TECHNICAL FIELD

The present disclosure relates to the field of electrochemical deposition technologies, and more particular, to an air drying device.

BACKGROUND

In the display field of Mini LED, micro LED, etc., since light emitting diode (LED) current is several tens of milliamps, thick Cu metal with high current carrying capability is required. Thus, electrochemically depositing thick copper can improve efficiency and reduce cost from an efficiency and cost perspective. After electrochemical deposition, residual electrochemical deposition chemical solution on a surface of a substrate will affect subsequent processes; therefore, it is necessary to remove the residual electrochemical deposition chemical solution on the surface of the substrate through water washing and air drying treatment, so as to ensure cleaning of the substrate surface and smooth progress of the subsequent processes.

SUMMARY

The embodiments of the present disclosure provide an air drying device, which can ensure effects of washing and air drying of substrates and facilitate smooth progress of subsequent processes.

The technical schemes provided by the embodiments of the present disclosure are as follows.

In one aspect, one embodiment of the present disclosure provides an air drying device, including:

a base including opposing top and bottom portions, the top portion including at least one first bearing surface; and at least one bearing plate disposed at the top portion of the base, the bearing plate including a second bearing surface, the first bearing surface being inclined relative to the second bearing surface.

In one embodiment, a plurality of first hollowed-out holes is defined in the first bearing surface; and a liquid collection tank is provided inside the base; and the plurality of first hollowed-out holes are in communication with the liquid collection tank.

In one embodiment, the base is further provided with a liquid outlet in communication with the liquid collection tank.

In one embodiment, a bottom portion of the liquid collection tank has a V-shaped tank structure.

In one embodiment, the bearing plate further comprises a back surface opposite to the second bearing surface, the bearing plate is provided with a plurality of second hollowed-out holes that extend through the second bearing surface and the back surface, and the plurality of second hollowed-out holes are in communication with the liquid collection tank.

In one embodiment, the plurality of second hollowed-out holes are spaced apart and arranged in a matrix.

In one embodiment, an area of the first hollowed-out hole is smaller than an area of the second hollowed-out hole.

In one embodiment, the liquid collection tank has an opening toward the top portion, and the bearing plate is at a side of the opening away from the bottom portion.

In one embodiment, at least two first bearing surfaces are provided and located at two opposite sides of the opening of the liquid collection tank; and at least two bearing plates are provided and are inclined in opposite directions, and a bottom end of each of the bearing plates is connected to a corresponding one of the first bearing surfaces, and top ends of the at least two bearing plates are connected together to form a V-shaped structure.

In one embodiment, the at least two bearing plates span over the liquid collection tank.

In one embodiment, the at least two bearing plates and the liquid collection tank enclose a hollow cavity; and the hollow cavity is in communication with the plurality of second hollowed-out holes.

In one embodiment, the first bearing surface is provided with a positioning structure.

In one embodiment, the positioning structure is a positioning groove defined in the first bearing surface.

In one embodiment, the base is connected to the bearing plate as an integral structure.

In one embodiment, the bottom portion of the base is further provided with a moving wheel.

In one embodiment, the base further comprises a sidewall between the top portion and bottom portion, and the sidewall is connected to the bearing plate.

In one embodiment, a lateral side edge of the bearing plate and a lateral side surface of the base are connected by the sidewall.

In one embodiment, a handle is provided on the sidewall.

The beneficial effects of embodiments of the present disclosure are as follows:

The air drying device provided by the embodiments of the present disclosure can be used for washing and air-drying a substrate after an electrochemical deposition process. The first bearing surface of the base and the second bearing surface of the bearing plate are inclined to each other, such that when the substrate is put on the air drying device, a bottom side edge of the substrate is supported by the first bearing surface, and the back surface of the substrate is supported by the second bearing surface, which allows the substrate to be obliquely placed on the air drying device. In such a way, the effect of washing and air-drying is ensured, which can effectively improve the efficiency and promote the smooth progress of subsequent processes.

DETAILED DESCRIPTION

In order to make objects, technical solutions and advantages of the present disclosure more apparent, the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain the other embodiments, which also fall within the scope of the present disclosure.

Unless otherwise defined, any technical or scientific terms used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than being limited to physical or mechanical connection. Such words as "on/above", "under/below", "left" and "right" are merely used to represent relative position relationship, and when an absolute position of an object is changed, the relative position relationship will be changed too.

In order to solve the problem in the related art that the chemical solution on the surface of the substrate after the electrochemical deposition process affects the subsequent processes, embodiments of the present disclosure provide an air drying device, which can ensure water washing and air drying effects of substrates, and promote the subsequent process to proceed smoothly.

Figure 1:
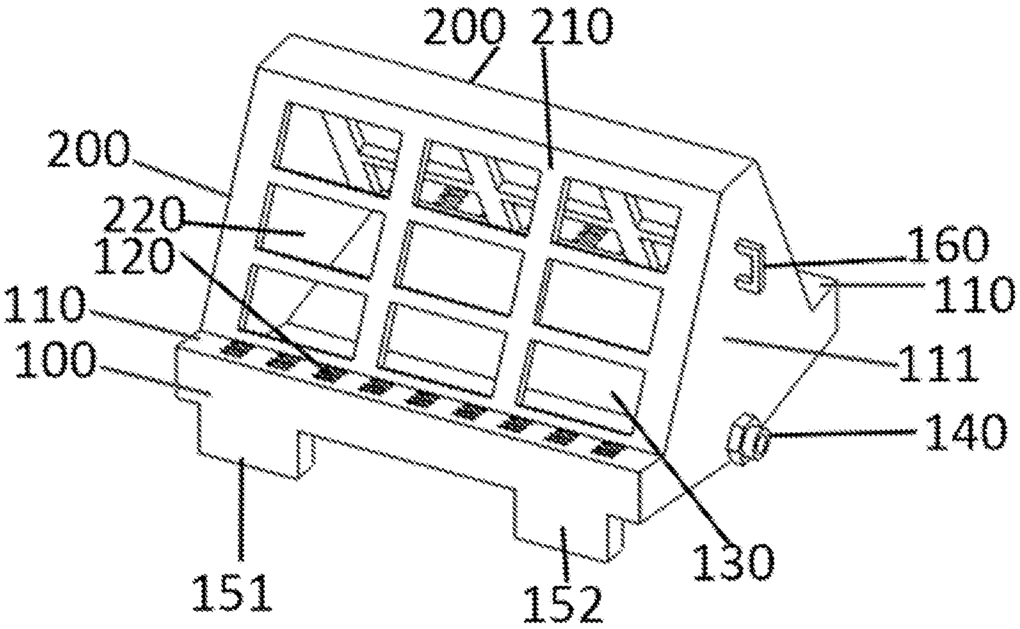
FIG. 1 is a schematic view of an air drying device according to an embodiment of the present disclosure.

As shown in FIG. 1, one embodiment of the present disclosure provides an air drying device, including:

a base 100 including opposing top and bottom portions, the top portion including at least one first bearing surface 110; and at least one bearing plate 200 disposed on the top portion of the base 100, the bearing plate 200 including a second bearing surface 210, the first bearing surface 110 being inclined relative to the second bearing surface 210.

Figure 2:
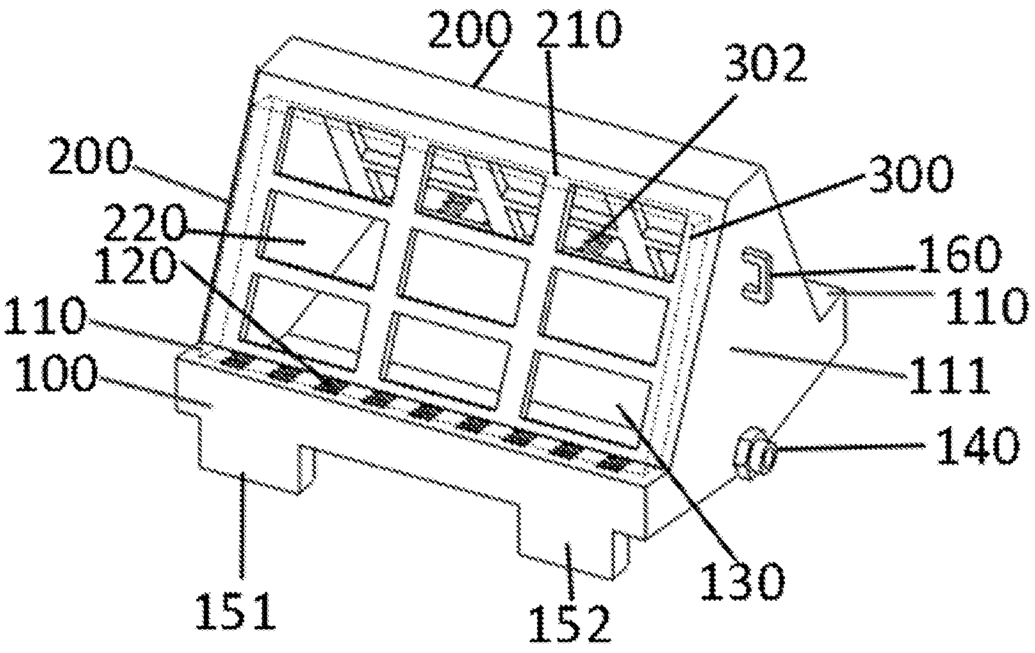
FIG. 2 is a schematic view showing the air drying device in a state of bearing a substrate according to an embodiment of the present disclosure.

The air drying device in the above-mentioned scheme can be used for water washing and air drying a substrate after an electrochemical deposition process. AS shown in FIG. 2, when a substrate 300 after the electrochemical deposition is water washed and air dried, the substrate 300 (in FIG. 2, the substrate 300 is represented by a dotted line) is put on the air drying device in such a manner that a bottom side edge of the substrate is supported by the first bearing surface 110 and a back surface of the substrate is supported by the second bearing surface 210. Since the first bearing surface 110 of the base 100 is inclined relative to the second bearing surface 210 of the bearing plate 200, the substrate can be obliquely placed on the air drying device. When water washing is performed, firstly, a washing liquid (such as pure water) can be used to rapidly wash the substrate from top to bottom and from two lateral sides of the substrate, and then the substrate is dried by using compressed air from top to bottom and around. Since the substrate is obliquely arranged, the washing liquid can smoothly flow down from the substrate, thereby ensuring that there is no residual electrochemical deposition chemical solution on the surface of the substrate. In particular, there is no residual chemical solution on a top side edge of the substrate, thereby ensuring effects of water washing and air drying of the substrate and promoting the smooth progress of subsequent processes.

It should be noted that, in practical applications, the air drying device can be used not only for water washing and air drying the substrate after the electrochemical deposition process, but also for other applications.

In addition, in some embodiments of the present disclosure, as shown in FIG. 1, a plurality of first hollowed-out holes 120 is defined in the first bearing surface 110; and a liquid collection tank 130 is provided inside the base 100, and the plurality of first hollowed-out holes 120 are in communication with the liquid collection tank 130. The base 100 is further provided with a liquid outlet 140 in communication with the liquid collection tank 130.

With the above-mentioned scheme, since the first bearing surface 110 is provided with the first hollowed-out holes 120, when the substrate is washed, the washing liquid can enter the liquid collection tank 130 from the first hollowed-out holes 120, which facilitates the collection of the washing liquid for reuse. Furthermore, due to the presence of the first hollowed-out holes 120, when the compressed air blows to the bottom portion of the substrate, the chemical solution does not rebound, which pollutes surfaces of samples.

In some embodiments, a positioning structure may further be provided on the first bearing surface 110 for positioning the substrate. The positioning structure may include a positioning groove 302 (as shown in FIG. 2) or the like provided in the first bearing surface 110. In some embodiments, the positioning groove 302 is reused as the first hollowed-out hole 120.

In addition, referring to FIG. 1, in some exemplary embodiments, a bottom of the liquid collection tank 130 has a V-shaped tank structure. The V-shaped tank structure facilitates the collection of washing fluid at the bottom of the liquid collection tank. Of course, it is understandable that in practical applications, specific structure of the liquid collection tank 130 is not limited thereto.

In addition, referring to FIG. 1, in some exemplary embodiments, the bearing plate 200 further includes a back surface opposite to the second bearing surface 210, the bearing plate 200 is provided with a plurality of second hollowed-out holes 220 that extend through the second bearing surface 210 and the back surface. The plurality of second hollowed-out holes 220 are in communication with the liquid collection tank 130.

In the above-mentioned scheme, a plurality of second hollowed-out holes 220 are defined in the bearing plate 200, and then residual liquid and pure water can be collected in the liquid collection tank 130 of the base 100 via the second hollowed-out holes 220, thereby facilitating washing and air-drying the back surface of the substrate.

Referring to FIG. 1, in some exemplary embodiments, the liquid collection tank 130 has an opening toward the top portion, and the bearing plate 200 is located at a side of the opening away from the bottom portion.

In the above-mentioned scheme, for example, when the air drying device is oriented as shown in FIG. 1, the opening of the liquid collection tank 130 is upwards, and the bearing plate 200 is arranged directly above the opening, so that the washing liquid can fall directly into the liquid collection tank 130.

Referring to FIG. 1, in some exemplary embodiments, at least two first bearing surfaces 110 are provided and located at opposite sides of the opening of the liquid collection tank 130. At least two bearing plates 200 are provided and are inclined in opposite directions, a bottom end of each of the bearing plates 200 is connected to a corresponding one of the first bearing surfaces 110, and top ends of the at least two bearing plates 200 are connected together for form a V-shaped structure.

With the above-mentioned scheme, taking FIG. 1 as an example, two first bearing surfaces 110 are provided, two bearing plates 200 are provided, and one inclined bearing plate 200 is arranged at a corresponding one bearing surface, so that two substrates can be washed and air-dried at the same time to improve the production efficiency.

It should be noted that the air drying device may also be provided with only one bearing plate 200, and may also be provided with more than two bearing plates 200, which are rationally selected according to practical application requirements.

Further, in some exemplary embodiments, the base 100 is connected to the bearing plate 200 as an integral structure. With regard to the example shown in FIG. 1, the base 100 further includes a sidewall 111 located between the top portion and the bottom portion. The sidewall 111 is connected to the bearing plate 200, in such a manner that a lateral side edge of the bearing plate 200 and a lateral side surface of the base 100 are connected via the sidewall 111, so that the bearing plate 200 and the base 100 cooperate together to form a hollow cavity. The bearing plate 200 and the base 100 may be integrally formed, and may be made of materials resistant to liquid corrosion.

Referring to FIG. 1, in some exemplary embodiments, the bottom portion of the base 100 is further provided with moving wheels, so that the air drying device further functions to carry substrates. The moving wheels may include a directional wheel 151 and a guide wheel 152, etc.

Referring to FIG. 1, a handle 160 is provided on the sidewall to facilitate operators to carry or pull the entire air drying device through the handle 160.

There are several things to explain:

(1) The drawings relate only to structures to which the embodiments of the present disclosure relate, and other structures may refer to general designs.

(2) In the drawings used to describe embodiments of the present disclosure, the thickness of layers or regions is exaggerated or reduced for clarity, i.e., the drawings are not to scale. It will be understood that when an element such as a layer, film, region or substrate is referred to as being "on" or "under" another element, it can be "directly on" or "directly under" the other element or intervening elements may be present.

(3) Without conflict, embodiments of the present disclosure and features of the embodiments may be combined with each other to provide new embodiments.

The above are optional embodiments of the present disclosure. It should be pointed out that, for persons having ordinary skill in the art, several improvements and changes may be made, without departing from the principle of the present disclosure. These improvements and changes should also be within the scope of the present disclosure.

What is claimed is:

1. An air drying device, comprising:

a base comprising opposing top and bottom portions, the top portion comprising at least one first bearing surface; and at least one bearing plate on the top portion of the base; wherein the bearing plate comprises a second bearing surface, the first bearing surface is inclined relative to the second bearing surface;

wherein a plurality of first hollowed-out holes is defined in the first bearing surface; and a liquid collection tank is provided inside the base; and the plurality of first hollowed-out holes are in communication with the liquid collection tank;

wherein the first bearing surface is provided with a positioning structure;

wherein the positioning structure is a positioning groove defined in the first bearing surface.

2. The air drying device according to claim 1, wherein the base is further provided with a liquid outlet in communication with the liquid collection tank.

3. The air drying device according to claim 1, wherein a bottom portion of the liquid collection tank has a V-shaped tank structure.

4. The air drying device according to claim 1, wherein the bearing plate further comprises a back surface opposite to the second bearing surface, the bearing plate is provided with a plurality of second hollowed-out holes that extend through the second bearing surface and the back surface, and the plurality of second hollowed-out holes are in communication with the liquid collection tank.

5. The air drying device according to claim 4, wherein the plurality of second hollowed-out holes are spaced apart and arranged in a matrix.

6. The air drying device according to claim 5, wherein an area of the first hollowed-out hole is smaller than an area of the second hollowed-out hole.

7. The air drying device according to claim 4, wherein the liquid collection tank has an opening toward the top portion, and the bearing plate is at a side of the opening away from the bottom portion.

8. The air drying device according to claim 7, wherein at least two first bearing surfaces are provided and located at two opposite sides of the opening of the liquid collection tank; and at least two bearing plates are provided and are inclined in opposite directions, and a bottom end of each of the bearing plates is connected to a corresponding one of the first bearing surfaces, and top ends of the at least two bearing plates are connected together to form a V-shaped structure.

9. The air drying device according to claim 8, wherein the at least two bearing plates span over the liquid collection tank.

10. The air drying device according to claim 8, wherein the at least two bearing plates and the liquid collection tank enclose a hollow cavity; and the hollow cavity is in communication with the plurality of second hollowed-out holes.

11. The air drying device according to claim 1, wherein the base is connected to the bearing plate as an integral structure.

12. The air drying device according to claim 1, wherein the bottom portion of the base is further provided with a moving wheel.

13. The air drying device according to claim 1, wherein the base further comprises a sidewall between the top portion and bottom portion, and the sidewall is connected to the bearing plate.

14. The air drying device of claim 13, wherein a lateral side edge of the bearing plate and a lateral side surface of the base are connected by the sidewall.

15. The air drying device according to claim 13, wherein a handle is provided on the sidewall.

* * * * *